No. 671,063.　　　　　　　　　　　　　　　　Patented Apr. 2, 1901.
E. F. BUTLER.
COVER FOR COOKING UTENSILS.
(Application filed Dec. 22, 1900.)
(No Model.)
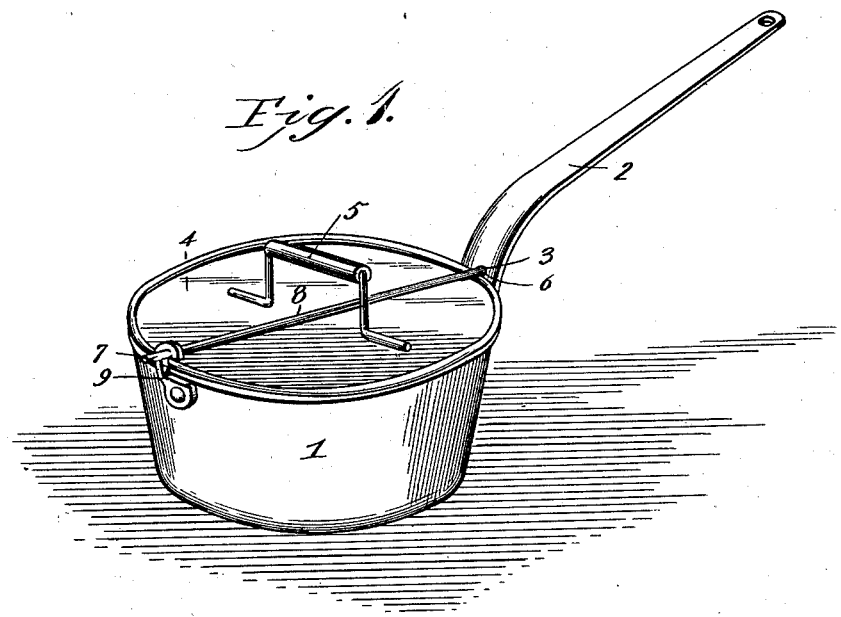
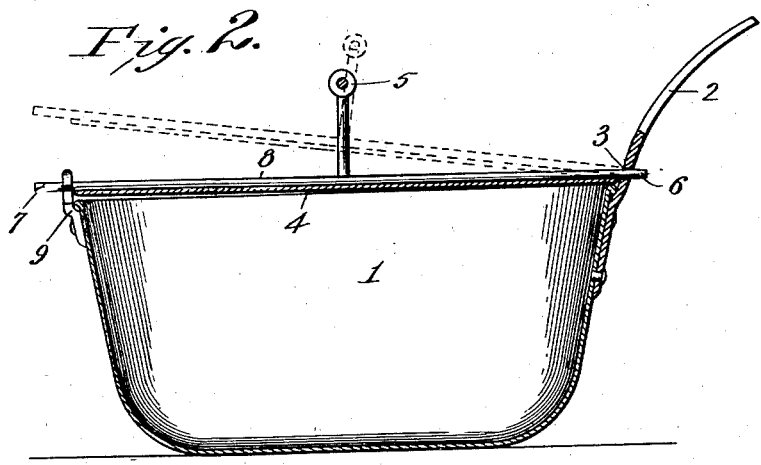
Witnesses　　　　　　　　　　　　E. F. Butler, Inventor.
　　　　　　　　　　　　　　　　by C. A. Snow & Co.
　　　　　　　　　　　　　　　　　　Attorneys

UNITED STATES PATENT OFFICE.

EDWARD FRANKLIN BUTLER, OF WHITEWATER, WISCONSIN.

COVER FOR COOKING UTENSILS.

SPECIFICATION forming part of Letters Patent No. 671,063, dated April 2, 1901.

Application filed December 22, 1900. Serial No. 40,793. (No model.)

*To all whom it may concern:*

Be it known that I, EDWARD FRANKLIN BUTLER, a citizen of the United States, residing at Whitewater, in the county of Walworth and State of Wisconsin, have invented a new and useful Cover for Cooking Utensils, of which the following is a specification.

This invention relates to cooking utensils, and has for its object to provide an improved cover therefor which is constructed for convenient application and removal and which when applied has a spring tension thereon for firmly holding the cover against accidental displacement and to permit of the liquid contents of the utensil being drained off without danger of spilling the solid contents.

With this and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a perspective view of a cooking utensil having the improved cover applied thereto. Fig. 2 is an enlarged sectional view thereof.

Like characters of reference designate corresponding parts in both figures of the drawings.

In the drawings there has been shown an ordinary stew-pan 1, having the usual laterally-projecting or substantially radial handle 2, which is fixedly secured to the outer side of the pan and bows upwardly and outwardly therefrom. A perforation 3 is formed in the base of the handle and adjacent to the upper marginal edge of the pan. To be more accurate, this opening is located slightly above the upper edge of the pan.

The cover is in the form of a metallic disk 4, which may or may not be provided with a beaded marginal edge. At the center of the top of the cover there is an upstanding handle 5 in the form of a bail fixed to the cover. At diametrically opposite points there is provided the opposite pins or projections 6 and 7, which extend a suitable distance beyond the marginal edge of the cover and are preferably formed by means of a diametric rod 8, soldered or otherwise secured to the upper side of the cover, thereby forming a stiffening-brace therefor.

In applying the cover to the pan either of the pins or projections—as, for instance, the one indicated by the numeral 6—is inserted into the perforation in the handle from the inner side thereof, as indicated by dotted lines in Fig. 2 of the drawings. It will be observed that the cover is inclined upwardly across the top of the pan, in view of the similar inclination of the opening 3. The free side of the cover is then forced downwardly and the projection 7 engaged with the fastening or keeper 9, so as to firmly secure the cover upon the open top of the pan. The fastening 9 is fixedly secured to the outer side of the pan, projects above the top edge thereof, and is provided with a bayonet-slot or is in the form of a hook having a lateral entrance slot or opening through which the adjacent pin 7 is laterally introduced into the vertical slot. When the pressure of the hand is removed from the cover, the free edge or side of the latter springs slightly upwardly, thereby raising the pin 7 to the upper extremity of the vertical member of the bayonet or L-shaped slot and above the lateral or horizontal slot, whereby the pin is locked against accidental displacement from the fastening.

To remove the cover, it is merely necessary to slightly depress the portion of the cover having the pin 7 and then give the cover a lateral movement upon the pivotal connection afforded by the opposite pin 6 and the opening 3 in the handle of the pan, whereby the pin 7 is disengaged from the fastening 9, and the pin 6 may then be freed from the handle and the cover thereby removed from the pan. When the cover is upon the pan, the latter may be tilted to drain off the liquid contents thereof at the edge of the cover without any danger of the cover being displaced, as the spring tension of the cover insures a positive interlocking engagement between the pin 7 and the fastening 9.

What is claimed is—

A pan, having a radial upwardly and outwardly inclined handle provided with a perforation at the upper marginal edge of the pan, a rigid hook-shaped fastening rising above the upper marginal edge of the pan diametrically opposite the handle, and a cover to close the open top of the pan, and provided with a diametric stiffening-rod, the opposite ends of which project beyond the peripheral edge of the cover, one of said ends being introduced into the perforation of the radial handle, and the opposite end engaged with the hook-shaped fastening, and a handle straddling the intermediate portion of the rod and rising from the cover.

In testimony that I claim the foregoing as my own I have hereto affixed my signature in the presence of two witnesses.

EDWARD FRANKLIN BUTLER.

Witnesses:
N. M. LITTLEJOHN,
E. N. LITTLEJOHN.